Sept. 2, 1969            A. MARTINEZ            3,464,387

FISH BREEDER

Filed May 8, 1967            2 Sheets-Sheet 1

INVENTOR.
ARTURO MARTINEZ

BY

OSTROLENK, FABER, GERB & SOFFEN
ATTORNEYS

Sept. 2, 1969     A. MARTINEZ     3,464,387
FISH BREEDER
Filed May 8, 1967     2 Sheets-Sheet 2
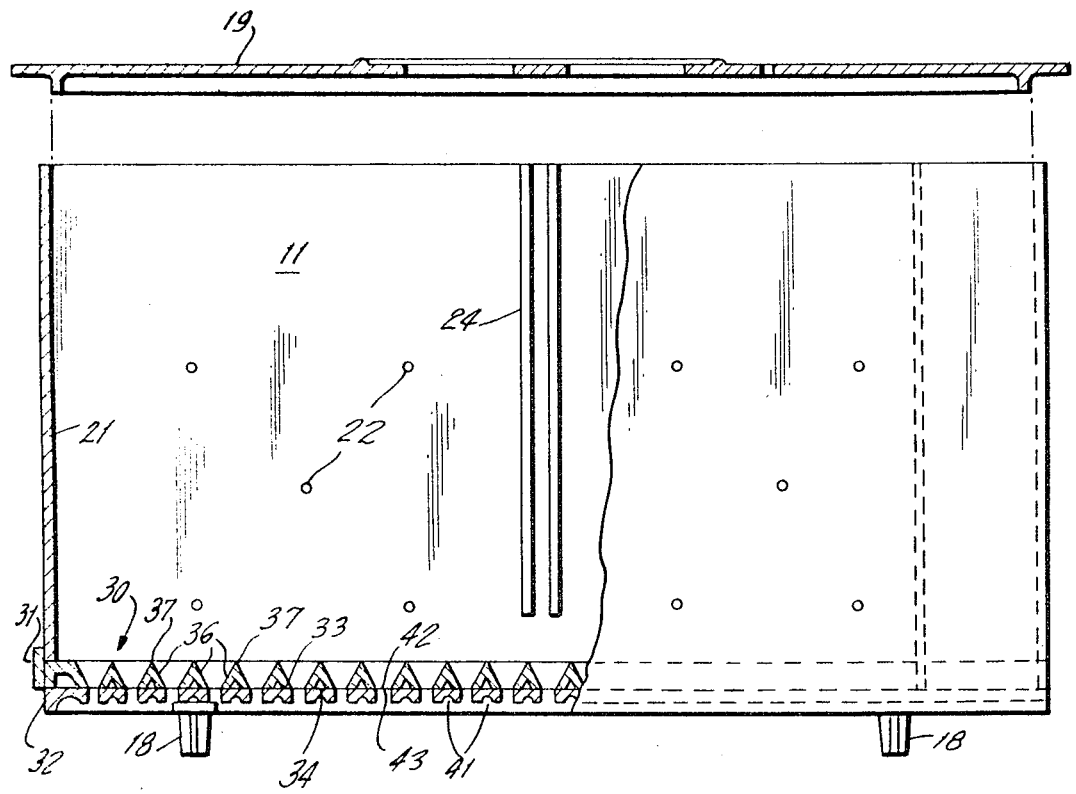
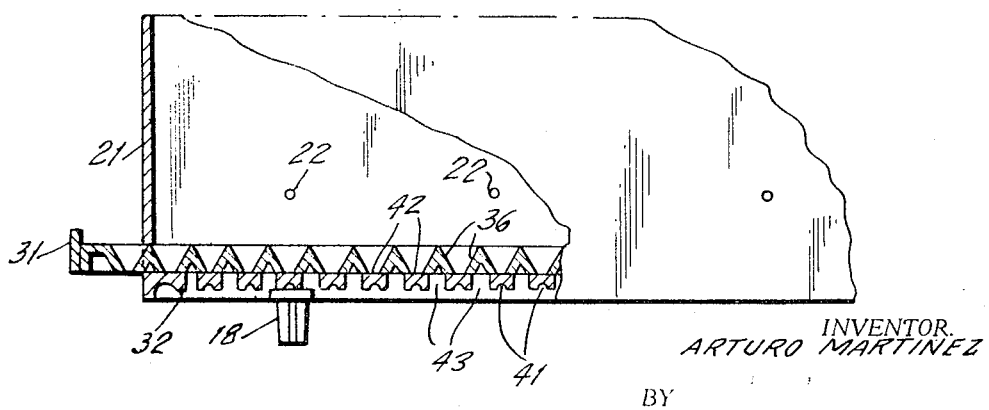
INVENTOR.
ARTURO MARTINEZ
BY
OSTROLENK, FABER, GERB & SOFFEN
ATTORNEYS

United States Patent Office 3,464,387
Patented Sept. 2, 1969

3,464,387
FISH BREEDER
Arturo Martinez, Apartada Aereo 8897,
Bogota, Colombia
Filed May 8, 1967, Ser. No. 636,847
Int. Cl. A01k *63/00, 64/00, 61/00*
U.S. Cl. 119—5                               6 Claims

ABSTRACT OF THE DISCLOSURE

A fish breeder having a first chamber into which are placed fish about to give birth and a second chamber, disposed beneath the first chamber, into which the newborn fish are to pass; and a horizontal partition between the two chambers consisting of two elements in surface engagement; both of the elements are comprised of a number of parallel spaced apart slats; one of the elements is movable with respect to the other whereby the slats on the movable element can be moved into a position either to block the openings between the slats on the other element which prevents anything from passing through the partition, or to register with the slats on the other element, causing the openings in the two elements to register, thereby permitting the bypassage of baby fish through the partition into the second chamber; the openings through the partition are also adjustable to intermediate positions sufficiently close that baby fish can pass through the openings between them but adult fish cannot.

---

Figure 1:
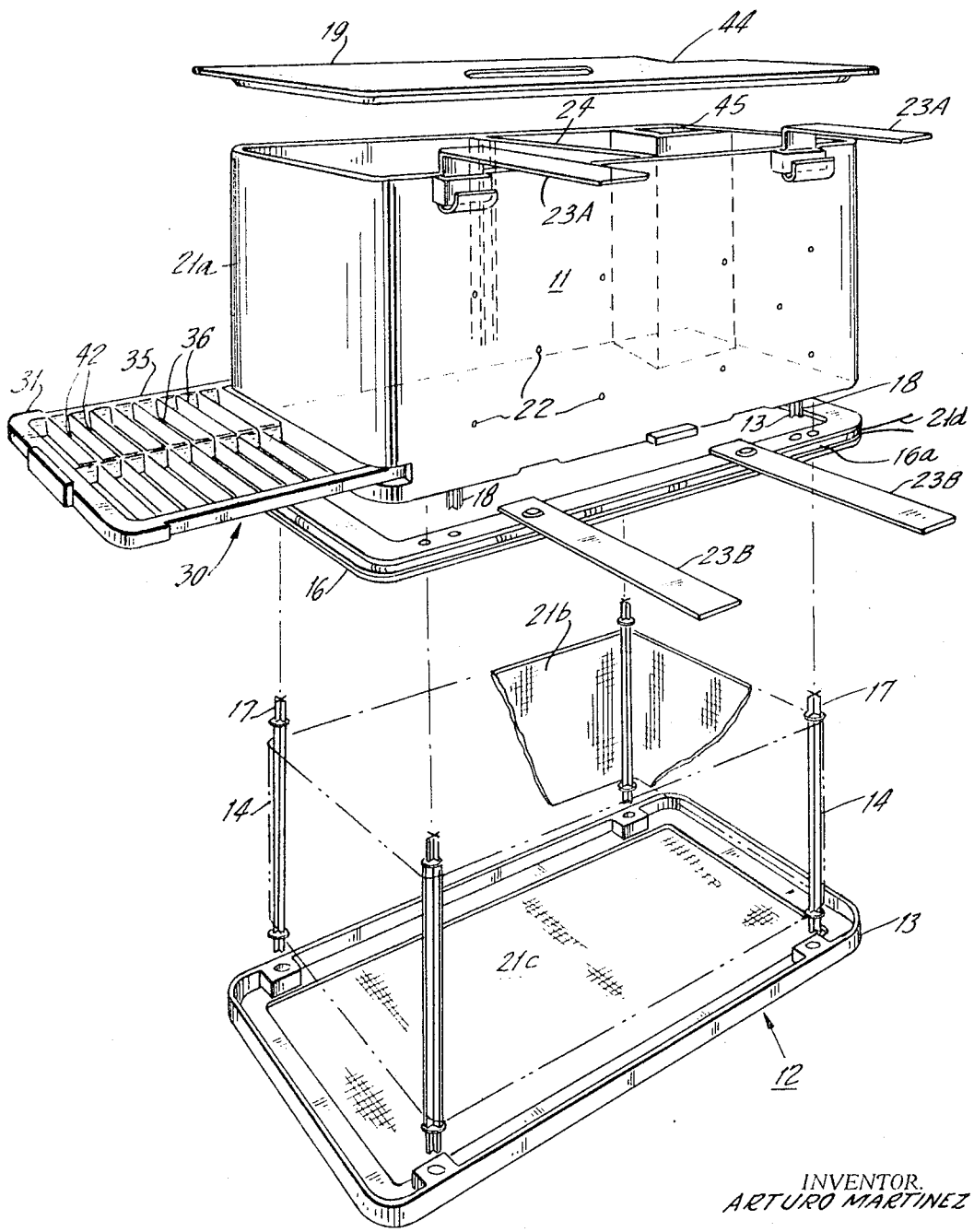

This invention relates to fish breeders and more particularly to a partition for placement between two chambers in a fish breeding tank or fish containing vessel to alternately permit or prevent the bypassage of baby fish while continuously preventing the bypassage of full grown fish between the chambers.

Fish are cannibalistic and grown fish will eat their own offspring after they are born. Accordingly, if fish are being bred, and it is desired to minimize the loss of small fish due to cannibalism, a means is necessary for protecting the smaller fish. The need to protect baby fish is greater in the confined volume of a fish tank, although the problem might arise, as well, in large scale commercial fisheries.

The present invention relates to a partition which divides a volume into two chambers, into one of which the small fish are able to travel but the large fish are not. The present invention relates to a partition having a movable element, which thereby provides adjustable size openings through which might pass small fish, and which element may also be moved to completely block the escape of small fish once they haved moved into the chamber in which they will be protected. Such partition has openings therethrough which permit small fish to pass through them while blocking larger fish from passing through.

The partition of the present invention comprises two surface abutting elements. Each element has openings which pass through it and through its abutting surface. The openings are positioned in predetermined locations. Between the openings on each element there is material which is impervious to adult and baby fish. The locations of the openings are chosen so that when the movable element is moved to a first position with respect to the stationary element, the openings in the elements register with each other, thereby enabling baby fish to pass from one chamber to the other. When the movable element is moved to a second position, the openings through the movable element are in registry with the impervious portions between the openings in the stationary element and the openings through the stationary element are in registry with the impervious portions between the openings through the movable element. In this manner, the small or baby fish are precluded from moving back into the chamber containing the larger fish where the little fish are in danger of being eaten. The movable element is movable to a plurality of intermediate positions, thereby adjusting the size of the openings through which the small fish can pass to enable the partition to be used with different size and species fish.

Accordingly, it is a primary object of the present invention to provide a fish breeder which protects baby or small fish from being eaten by larger fish.

It is another object of the present invention to provide such a fish breeder which is adjustable to protect various size or species of small fish against various size or species of larger fish.

It is another object of the present invention to carry out the foregoing objects with a two element partition, each element of which has openings therethrough and one of which elements is movable with respect to the other to cause the openings in the elements to move from being in near perfect registry to being completely out of registry, thereby causing the partition to have respectively, openings or no openings passing completely therethrough.

These and other objects of the present invention will become apparent after consideration of the following description of the accompanying drawings in which:

FIGURE 1 is an exploded perspective of a fish breeder with the partition of the instant invention;

FIGURE 2 is a side view, partially broken away, showing the partition of the instant invention in a position permitting bypassage of baby fish between the chambers of the fish breeder; and FIGURE 3 is a view, in the direction of view of FIGURE 2, showing the partition of the instant invention in a second position which bars baby or small fish from passing through the partition between the chambers.

Referring to the figures, and particularly to FIGURE 1, a fish breeder is shown which is comprised of a top chamber 11, a bottom chamber 12, and a partition 30. The bottom chamber 12 is supported in a frame 13 which has support shafts 14 positioned therein. Shafts 14 receive upper chamber support frame 16 at their upper ends 17. Upper chamber support frame 16, in turn, receives shafts 18 which depend from chamber 11 and which when mounted in frame 16, support chamber 11. A cover 19 is provided for the upper chamber 11. The entire fish breeder is positioned in a fish tank filled with water.

The chambers 11 and 12 have walls 21 which may be comprised of any material not soluble in water. A preferred material for the walls 21a of chamber 11 is polyethylene plastic, which may be transparent so that the progress of breeding can be observed. The walls 21b of chamber 12 and the floor 21c thereof are comprised of transparent nylon mesh so that the growth of the baby fish can be observed. The nylon mesh walls are secured, e.g. by nylon rope 21d to frame 16, which rope passes around groove 16a of frame 16.

The walls 21a of chamber 11 have a plurality of apertures 22 therethrough, which permit free air and water interchange between the rest of the tank and the chamber 11. The apertures 22, however, must be sufficiently small that no fish is able to pass through them out of the fish breeder or else the purpose of the fish breeder will be frustrated.

The nylon mesh walls of chamber 12 are sufficiently porous to permit the required water and air interchange with the rest of the tank.

Arms 23A and 23B are provided, respectively, on chambers 11 and 12 if they are needed for supporting the chambers of the fish breeder in the tank (not shown). The arms 23A and 23B support the chambers whether they are together or separated, as described below.

A solid partition 24 may be provided in the chamber 11, if, for example, it is desired to segregate different types of larger fish in the chamber 11, e.g., different species of the larger fish may be producing offspring simultaneously.

Referring to FIGURES 2 and 3, the partition 30 between chambers 11 and 12 is comprised of a top element 31 and a bottom element 32. The top element has a lower surface 33 and the bottom element has an upper surface 34, which surfaces are in abutting engagement with one another. The top element 31 has a frame 35 around it (see FIG. 1), which frame supports a plurality of spaced parallel strips or slats 36. The top element 31 faces the chamber 11 out of which, as will be discussed below, baby or small fish pass. The strips 36 are wedge shaped, each having an apex 37 which points toward chamber 11.

The strips 36 are wedge shaped so that if small fish drop or swim from chamber 11 toward chamber 12, they will not have flat surfaces, provided by the strips 36, on which to come to a rest. The inclined sides of strips 36 will cause the baby fish to slide past partition 30 into chamber 12.

Element 32 is also comprised of a plurality of spaced parallel slats or strips 41. The strips 41 are supported in position by the walls of the chamber 11 or by any other supporting means, since, as will be shown below, the element 32 remains stationary.

Because strips 36 are spaced apart and because strips 41 are spaced apart, there are openings between them. Strips 36 are separated by openings 42 and strips 41 are separated by openings 43.

The material of which the strips 36 and 41 is comprised is not critical to the present invention, except that it cannot be water soluble and must be impervious to adult fish and to small and baby fish, so that the partition will be effective.

Comparing FIGURES 2 and 3, it can be seen that element 31 is movable with respect to element 32, while their respective surfaces 33 and 34 remain in engagement. The strips 36 and 31 are so positioned that they can be moved, relative to one another, so that the openings 42 and 43 are in near perfect registry with each other, thereby providing openings in the partition, and can be moved to another position where the openings 42 are in registry with the strips 41 and the openings 43 are in registry with the strips 36, thereby closing the partition. The element 31 is adjustable to any intermediate position between that of FIGURES 2 and 3, thereby providing adjustability in the size of the openings in the partition between the chambers 11 and 12.

The breeder is employed by placing the adult fish about to give birth in the upper chamber 11. Cover 19 is then placed over upper chamber 11 and the adult fish are contained in the chamber. Adjustable element 31 is moved to the position shown in FIGURE 2 so that the young fish after they are born, are enabled to swim through the partition into the lower chamber 12 while the adult fish are prevented from passing through. If a smaller species of adult fish is giving birth, the size of the openings in partition 30 can be appropriately adjusted by moving element 31 to an intermediate position between that shown in FIGURES 2 and 3.

The adult fish are observed regularly, and after they have given birth and the baby fish have swum or settled into the bottom chamber 12, the partition 30 is closed by moving element 31 into the condition of FIGURE 3. This prevents the young fish, as they become more able swimmers, from swimming back into chamber 11 where they are likely to be eaten. It also continues to prevent the larger adult fish from passing through the partition 30 into the lower chamber 12.

Referring to FIGURE 1, an aperture 44 in cover 19 leads into a conduit 45 which passes through chamber 11 and through partition 30 and empties into chamber 12. Food for the baby fish can be passed to lower chamber 12 through conduit 45.

If it is desired to reuse the fish breeder, chamber 12 is separated from chamber 11, and with the baby fish still in it can be hung in the tank (not shown) or placed by the side of chamber 11 where the baby fish will grow unmolested. The open top of chamber 12 can be covered, by a cover similar to cover 19, to prevent escape of the baby fish. The fish in chamber 11 are replaced with other fish about to give birth. A new chamber 12 can then be positioned beneath chamber 11. Alternatively, chamber 12 could be emptied into another container and the same chamber 12 be positioned beneath chamber 11 to start the operation over again.

There has just been described a novel fish breeder, adaptable for use, not only in a fish tank, but also in a large fishery. The fish breeder has a partition between two chambers, the partition having openings which can be opened or closed by the use of a simple movable element to permit the baby fish to swim or drift out of danger of being eaten by larger fish and to trap the baby fish to prevent them from swimming back into danger. While the present invention has been described in connection with a partition between chambers that are vertically disposed with respect to one another, the present invention is equally adaptable for use in a fish breeder where the chambers are horizontally disposed with respect to one another.

The present invention is adaptable for use, not only in conjunction with the breeding of fish, but may also be used to protect small fish from injury by larger fish. The small fish can be attracted, e.g., by food, through the partition and into the protective chamber. When they have all entered the protective chamber the partition can be closed and the smaller fish can be protected.

Although there has been described a preferred embodiment of this novel invention, many variations and modifications will now be apparent to those skilled in the art.

The embodiments of the invention in which an exclusive privilege or property is claimed are defined as follows:

1. In a fish breeder, comprising, a first chamber for containing fish about to produce offspring, a second chamber into which the fish offspring are to move and in which they are to be contained, and a partition between said first and said second chamber, the improvement comprising, said partition having openings therethrough which are larger than the fish offspring to permit the offspring to pass from said first to second chamber, and which are smaller than the fish which produced the offspring to prevent these fish from entering said second chamber, said partition comprising means for closing said openings through said partition sufficiently to prevent the bypassage of fish offspring and for opening said openings through said partition sufficiently to permit the bypassage of fish offspring, said partition comprising a first element having a first surface; said first element being comprised of a plurality of substantially parallel first strips of material impervious to fish and fish offspring; said first strips being spaced apart, thereby forming first openings through said first element between adjacent first strips;

said partition also comprising a second element having a second surface which is in abutting engagement with said first surface of said first element; said second element being comprised of a plurality of substantially parallel second strips of material impervious to fish and fish offspring; said second strips being spaced apart, thereby forming second openings through said second element between adjacent second strips;

said first openings through said first element and said second openings through said second element coacting to form said openings through said partition;

said second element being movable with respect to said first element between a first and a second position; said first and said second strips being so positioned that in said first position, said first strips and said first openings register, respectively, with said second strips and said second openings, and in said second position, said first strips register with said second openings and said second strips register with said first openings.

2. In the fish breeder of claim 1, the improvement further comprising, said second element being adjustable to a plurality of positions intermediate said first and said second positions, whereby the size of the openings through said partition can be varied.

3. In the fish breeder of claim 1, the improvement further comprising, one of said first and said second elements facing toward said first chamber; each of said strips of said one element being wedge shaped and having an apex facing into said first chamber.

4. In the fish breeder of claim 1, the improvement further comprising, said partition comprising a first and a second element; said first element having a first surface; said first element having openings therethrough in predetermined positions and passing through said first surface;

said second element having a second surface; said second element having openings therethrough in predetermined positions and passing through said second surface;

said first and said second surfaces being in abutting engagement with each other; said second element being movable with respect to said first element between a first and a second position;

said first and said second elements having portions impervious to fish and fish offspring between said openings therethrough;

said openings through said second element being so positioned as to register with the said openings through said first element when said second element is in the first position; said openings through said second element being so positioned that said openings through said first element register with said impervious portions of said second element and said openings through said second element register with said impervious portions of said first element, when said second element is in the second position;

said first openings coacting with said second openings, serve as the openings through said partition.

5. In the fish breeder of claim 4, the improvement further comprising, said second element being adjustable to a plurality of positions intermediate the first and second positions, whereby the first and second openings are out of registry with each other to a predetermined extent, thereby decreasing the size of the openings through the partition.

6. In the fish breeder of claim 4, the improvement further comprising, one of said first and said second elements facing toward said first chamber; said impervious portions of said one element being wedged shaped and having an apex facing into said first chamber.

References Cited

UNITED STATES PATENTS

| | | | |
|---|---|---|---|
| 680,838 | 8/1901 | Bourgeois | 119—3 |
| 1,552,063 | 9/1925 | Kuehn | 119—3 |
| 2,690,158 | 9/1954 | Petty | 119—3 |
| 3,140,691 | 7/1964 | Stark | 119—5 |
| 3,204,605 | 9/1965 | Vroman | 119—3 |
| 3,216,395 | 11/1965 | Girard | 119—3 X |
| 3,291,098 | 12/1966 | Halpert | 119—5 |
| 3,304,912 | 2/1967 | Hackman et al. | 119—5 |

ALDRICH F. MEDBERY, Primary Examiner

U.S. Cl. X.R.

119—3